(12) United States Patent
Berst et al.

(10) Patent No.: US 12,145,228 B2
(45) Date of Patent: Nov. 19, 2024

(54) MOUNT SYSTEM

(71) Applicant: Components Express, Inc., Woodridge, IL (US)

(72) Inventors: John Berst, Woodridge, IL (US); Art Didyk, Chicago, IL (US); Nick DeFrancesco, Sugar Grove, IL (US); Rick Ragnini, Downers Grove, IL (US)

(73) Assignee: Components Express, LLC, Woodridge, IL (US)

( * ) Notice: Subject to any disclaimer, the term of this patent is extended or adjusted under 35 U.S.C. 154(b) by 100 days.

(21) Appl. No.: 17/952,281

(22) Filed: Sep. 25, 2022

(65) Prior Publication Data

US 2023/0015464 A1 Jan. 19, 2023

Related U.S. Application Data

(63) Continuation of application No. 17/503,340, filed on Oct. 17, 2021, now Pat. No. 11,628,523.

(51) Int. Cl.
| | |
|---|---|
| *B23P 13/00* | (2006.01) |
| *B21D 53/00* | (2006.01) |
| *B23B 1/00* | (2006.01) |
| *B23K 26/362* | (2014.01) |
| *B25J 19/02* | (2006.01) |
| *F16M 11/12* | (2006.01) |

(Continued)

(52) U.S. Cl.
CPC .............. *B23P 13/00* (2013.01); *B21D 53/00* (2013.01); *B23B 1/00* (2013.01); *B23K 26/362* (2013.01); *B25J 19/023* (2013.01); *F16M 11/12* (2013.01); *F16M 13/02* (2013.01); *B23P 13/02* (2013.01); *B23P 25/006* (2013.01); *B25B 11/02* (2013.01); *Y10T 29/49771* (2015.01); *Y10T 29/4978* (2015.01); *Y10T 29/4984* (2015.01); *Y10T 29/49844* (2015.01); *Y10T 29/49861* (2015.01); *Y10T 29/4995* (2015.01)

(58) Field of Classification Search
CPC .... F16M 11/12; F16M 11/121; F16M 11/123; F16M 2200/022; F16M 11/2014; F16M 13/022
USPC ..... 248/316.1, 278.1; 16/338–339, 341–342, 16/221–392
See application file for complete search history.

(56) References Cited

U.S. PATENT DOCUMENTS

| | | | | |
|---|---|---|---|---|
| 3,536,284 A | * | 10/1970 | Chickering, Jr. ...... | F16M 11/10 248/224.51 |
| 3,837,042 A | * | 9/1974 | White ..................... | E05D 7/083 16/385 |

(Continued)

*Primary Examiner* — Christopher Garft
(74) *Attorney, Agent, or Firm* — Chris Tanner; FYPA, PLLC

(57) ABSTRACT

A mount system and method of manufacture for e.g. a machine vision camera is disclosed. The mount system comprises a rectangular base, a lower clamp disc, an upper clamp disc, a tilting plate, an expansion clamp, and an O-ring. The expansion clamp comprises a tapered head screw and an expandable mandrel, both typically made of stainless steel. The mount system facilitates improved machine vision by enabling effective mounting of machine vision cameras in smaller spaces and/or spaces requiring unusual angles and intricate positioning. The mount system is also advantageous in inhospitable environments having harsh environmental factors. The mount system is also easier for machine vision personnel to learn and understand.

7 Claims, 13 Drawing Sheets

(51) Int. Cl.
*F16M 13/02* (2006.01)
*B23P 13/02* (2006.01)
*B23P 25/00* (2006.01)
*B25B 11/02* (2006.01)

(56) References Cited

U.S. PATENT DOCUMENTS

| | | | | |
|---|---|---|---|---|
| 5,335,142 | A * | 8/1994 | Anderson | G06F 1/1681 |
| | | | | 361/679.55 |
| 5,853,158 | A * | 12/1998 | Riggle | A47G 23/0225 |
| | | | | 248/278.1 |
| 6,244,553 | B1 * | 6/2001 | Wang | F16M 11/2021 |
| | | | | 379/454 |
| 6,522,748 | B1 * | 2/2003 | Wang | B60R 11/02 |
| | | | | 379/454 |
| 9,663,173 | B2 * | 5/2017 | Wadey | B62J 11/00 |
| 2001/0046409 | A1 * | 11/2001 | Fischer | B60R 11/02 |
| | | | | 403/92 |
| 2011/0072619 | A1 * | 3/2011 | Wang | G06F 1/1681 |
| | | | | 16/342 |
| 2015/0273703 | A1 * | 10/2015 | Wang | F16M 11/2014 |
| | | | | 901/20 |
| 2016/0131963 | A1 * | 5/2016 | Clearman | F16M 11/2014 |
| | | | | 224/267 |
| 2020/0208670 | A1 * | 7/2020 | Stewart | F16B 25/0047 |

\* cited by examiner twin spindle lathe 904

FIG. 9

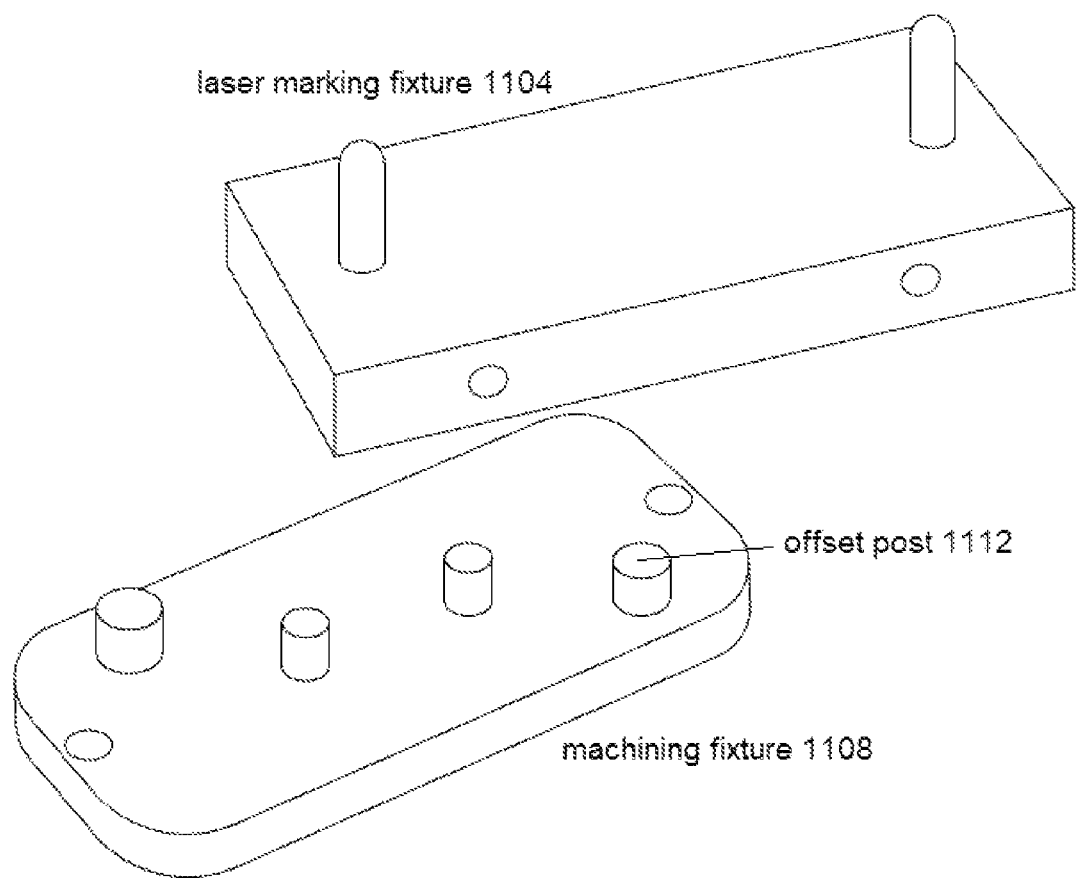
FIG. 11 (various dedicated fixtures, prior to use)

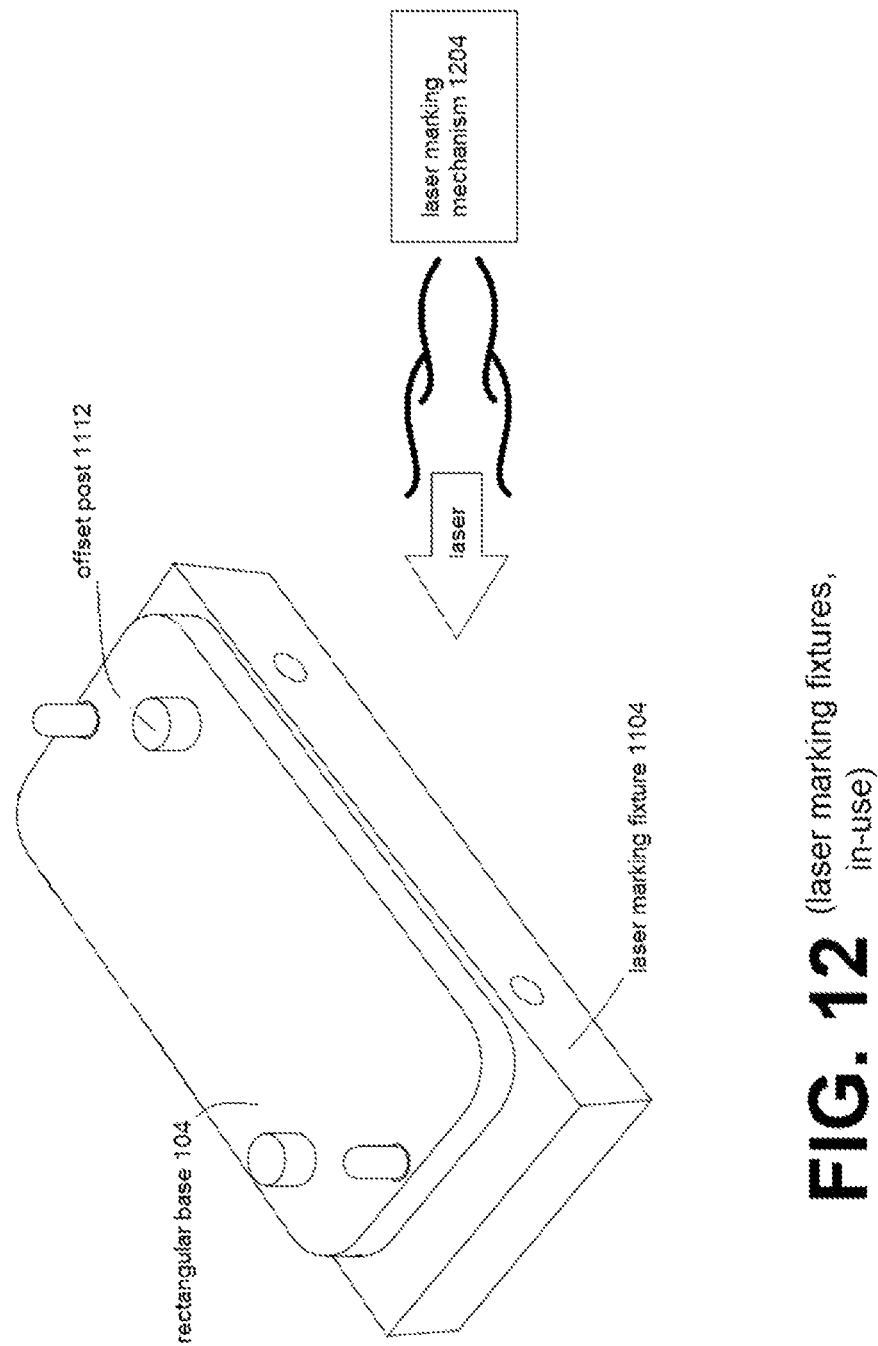
FIG. 12 (laser marking fixtures, in-use)

MOUNT SYSTEM

BACKGROUND OF THE INVENTION

In the world of machine vision, it can be difficult to mount machine vision cameras to various moving parts. The moving parts, such as robot arms, have limited space to attach items. Further, the moving parts may vibrate a lot, and engage in unusual movement that could put a lot of strain on a mount. Further, the moving parts may operate in small spaces and/or spaces requiring unusual angles and intricate positioning. The moving parts may also operate in inhospitable environments having harsh environmental factors, such that the cameras or other parts may require frequent adjustment, and sometimes shake loose.

Consequently, an improved mount system is desired.

BRIEF DESCRIPTION OF THE DRAWINGS

FIG. 9 shows a twin spindle lathe with live tooling, used in manufacturing;

FIG. 11 shows detail of the rectangular base; and

FIG. 12 shows a fixture used for laser-marking a rectangular base that was recently cut (machined).

DETAILED DESCRIPTION OF THE PREFERRED EMBODIMENTS

Figure 1:
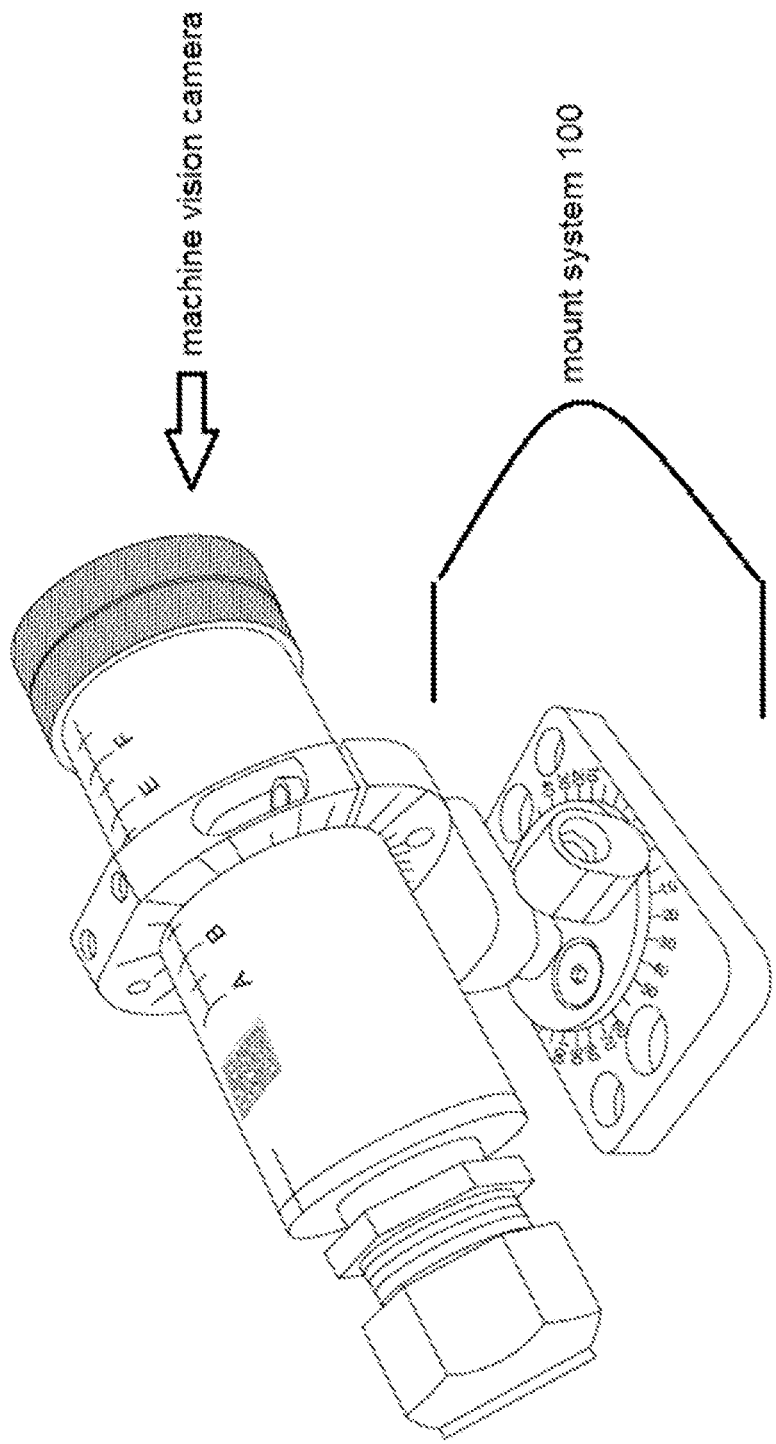
FIG. 1 shows an example embodiment of a mount system attached to a camera.
Figure 2:
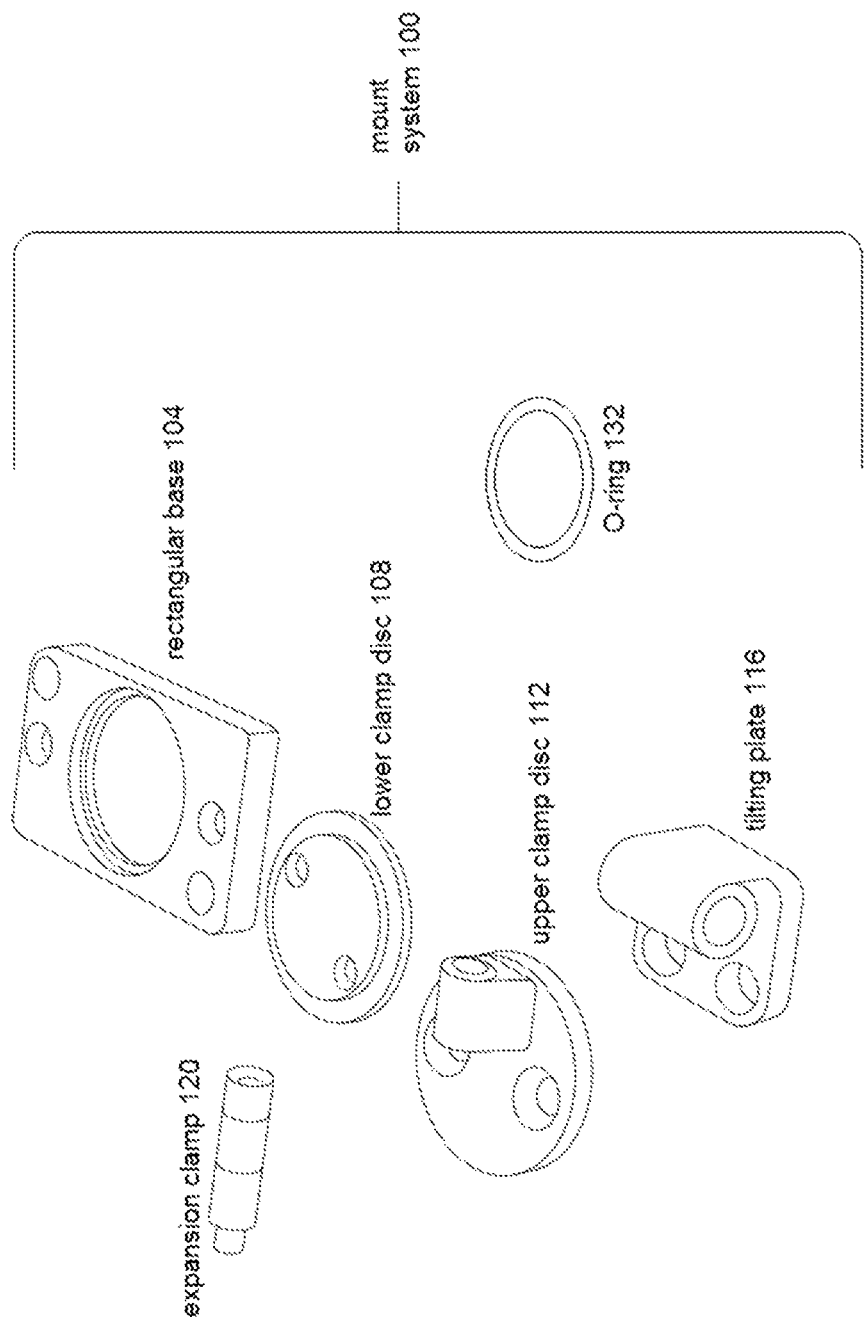
FIG. 2 shows more details of the components within the mount system.
Figure 3:
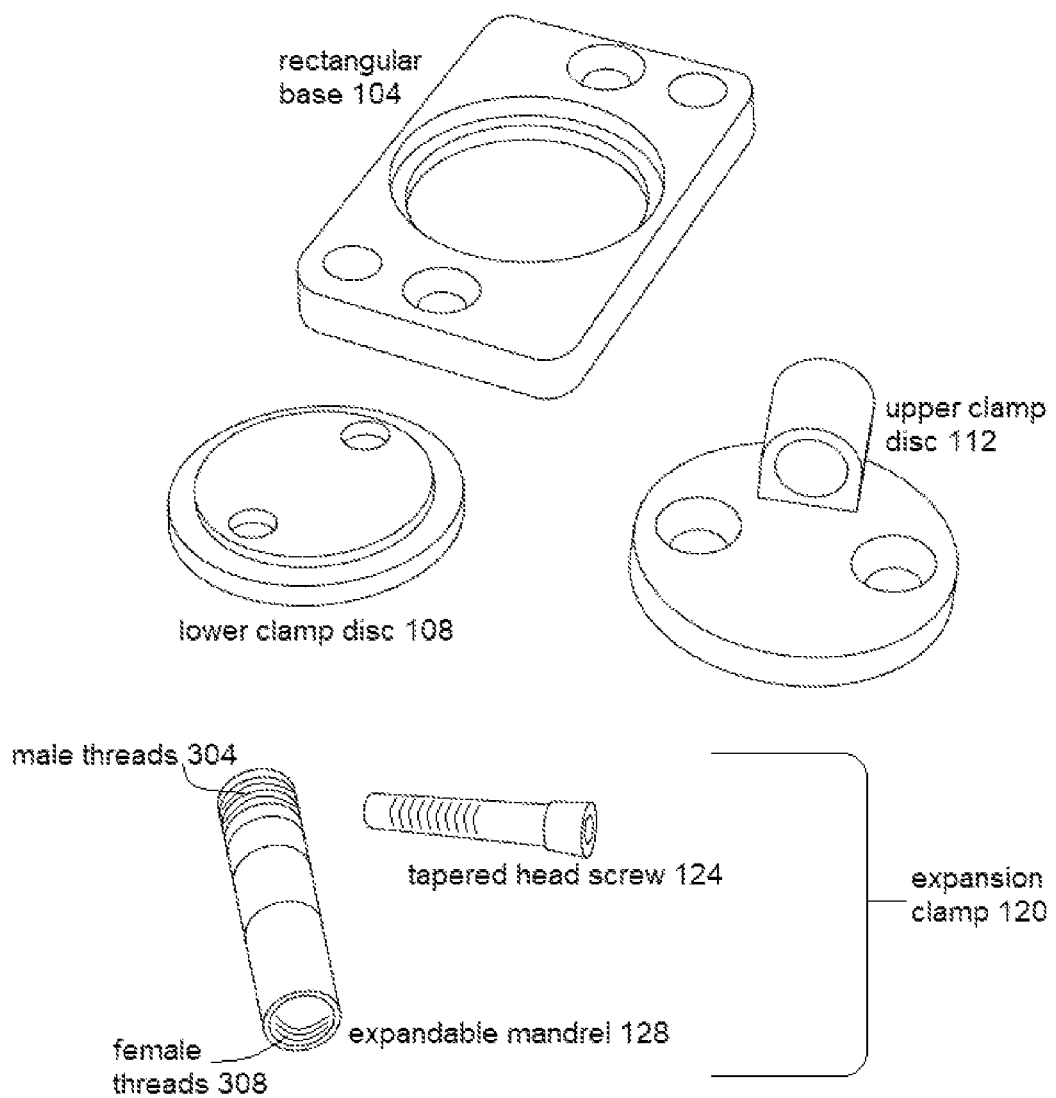
FIG. 3 shows an expansion clamp comprising a tapered head screw and an expandable mandrel.

FIG. 1 shows an example embodiment of a mount system 100, with a machine vision camera attached thereto. FIG. 2 shows more details of the components within the mount system 100, comprising a rectangular base 104, a lower clamp disc 108, an upper clamp disc 108, a tilting plate 116, an expansion clamp 120, and an O-ring 132. As shown in FIG. 3, the expansion clamp 120 comprises a tapered head screw 124 and an expandable mandrel 128, both made of stainless steel.

How it Works, What it does

The mount system 100 facilitates improved machine vision by enabling effective mounting of machine vision cameras in smaller spaces and/or spaces requiring unusual angles and intricate positioning. The mount system 100 is also advantageous in inhospitable environments having harsh environmental factors. The mount system 100 is also easier for machine vision personnel to learn and understand. Finally, once installed, the mount system 100 can be put into "set it and forget it" mode, holding the camera in an exact position without further adjustment, and without concern that the mount system 100 will shake loose.

Within the mount system 100, a first amount of adjustability comes from the upper clamp disc 112 which spins 360 degrees about a first axis. A second amount of adjustability comes from the tilting plate 116 which spins <360 degrees about a second axis. This second axis is defined by achieving a collinear alignment of the upper clamp disc 112 and the tilting plate 116, with the expansion clamp 120 penetrating both apertures along the collinear axis.

The total range of motion about the second axis depends on the size of the device being mounted, the amount of space available, and any protruding portions or irregular shapes on either the surface being mounted to, or on the type of device being mounted. Still, the 360 degrees of rotation about the first axis, combined with a considerable amount of rotation although <360 degrees about the second axis, results in significant advantages in mounting flexibility.

The name tilting plate 116 is chosen because it achieves two functions. Not only tilting, but also acts as a plate that holds the device or instrument being mounted, e.g. camera (FIG. 1) or light fixture (FIG. 1), thus a type of interface to the device or instrument being mounted. The tilting plate 116 has a plate at the top. The cylinder underneath it is the tilting part, while the plate acts as an attachment point to the item being mounted. Thus, the name tilting plate 116.

As shown at least within FIGS. 2 and 3, the rectangular base 104 is equipped with a complete bore-through, which increases the clamping pressure available for the mount system 100. A strong, thick strength aluminum is necessary for the rectangular base 104, as 6000 aluminum deforms too easily, especially considering the torsion and strain occurring on parts of the rectangular base 104. There also exists a spacing issue, in that tapping holes too close together can result in material weakness and deformation of the rectangular base 104. Thus, the 7000 series of aluminum results in a stronger version of rectangular base 104 and avoids deforming.

The rectangular base 104 is shown in FIGS. 1-3 having two through holes. These can mount (verb) into whatever flat surface a user may want, whether that be lights (FIG. 10), cameras (FIG. 1), lasers, or other usages too numerous to mention.

Expansion Clamp 120

Conventional mounts may comprise a mere bolt that join two parts, where users just tighten the bolt as hard as they can. Other expansion products may try to adhere those two together. Meanwhile, during assembly and use, the mount system 100 actually increases a size of the expansion clamp 120, so the mount system 100 can repeatedly do a bunch of different positions and not mar any of it or cause permanent indentations that make a device eventually get stuck into one position.

Any other sort of tilting bracket, normally there'd be an axial bolt and users would just tighten that axial bolt as high-tension as possible. That's what would keep it from rotating. But eventually such an implementation will cause indentations a conventional mounting devices. Eventually, mechanical failure will occur.

In sharp contrast, embodiments of the expansion clamp 120 disclosed herein use the tapered head screw 124 because once installed within the expansion mandrel 128, the expansion clamp 120 can be locked permanently in place with adhesive. A user expands the expansion clamp 120 by turning the tapered head screw 124 thereby setting a position of the expansion mandrel 128. Thus, the expansion clamp 120 clamps from within, internally, not externally.

Contrast this with the conventional method of merely tightening a clamping bolt, which results in the threaded surface eventually just twisting and rotating with the tightening force when trying (unsuccessfully) to tighten it, eventually wearing out the bolt, and whatever parts the bolt is joining together.

Next, the embodiments herein also make use of the expansion clamp 120 in a way that has not been done before. No one else uses an expansion clamp 120 to stop rotation. Most other implementations are using an expansion clamp in a rotating fashion, e.g. for pulling something up for tightening, or for pulling something down for loosening. The novel idea is using it to stop the rotation. That is, a typical expansion clamp is going for the ultimate accuracy of holding position, not stopping rotation.

The embodiments herein achieve more usage and more variety of usages, thereby permitting later backing out and re-tilting at some other angles, including re-use of the expansion clamp 120 for many different clamping positions. The embodiments herein strive for flexibility, and to be infinitely adjustable. In striving for more precision, one might lose some adjustability, the flexibility, the compliance. The embodiments herein achieve a balance of these factors.

The expandable mandrel 128 has threaded surfaces on its interior and on its exterior, thus has both male and female connectors. As shown in FIG. 3, the male portion 304 of the expandable mandrel 128 goes into the upper clamp disc 112. Meanwhile, the female portion 308 of the expandable mandrel 128 accommodates the male portion of the tapered head screw 124. The expandable mandrel 128 is thus subject to a considerable amount of stress and torque but has safeguards and features to manage that stress and torque.

When assembling the expansion clamp 120, customers typically want the upper disc clamp 112 to not move. Accordingly, it is possible to use a two-phase glue that has a separate activator component. The expansion clamp 120 is stainless steel and thus may have adhesion problems. Meanwhile, the upper disc clamp 112 is anodized aluminum. Both are slippery surfaces, and thus need some help remaining in a fixed position.

To address this slipperiness, the two-phase glue penetrates enough to where the upper disc clamp 112 and expansion clamp 120 actually lock together. In manufacturing, it is best to put the glue on the inside of the base of the threads of the expansion clamp 120.

That's the way the glue works, it expands and fills all the gaps in between the threads. For the mount system 100 to work effectively, the upper clamp disc 112 is un-rotatable e.g. once the glue cures.

Making of the Expansion Clamp 120

A mandrel is a round piece that holds items in position. The tapered head screw 124 and expandable mandrel 128 form the expansion clamp 120. The rectangular base 104 is made out of aluminum. The upper clamp disc 112 is made out of aluminum, while the tapered head screw 124 and the expandable mandrel 128 and are made from stainless steel. These materials are chosen to achieve a balanced mix of corrosion resistance and strength. Aluminum would not be strong enough, would be too soft for the expansion clamp 120. Steel would be stronger, but it would corrode in a lot of environments. In an embodiment, make the expansion clamp 120 out of stainless steel, which doesn't corrode.

It becomes very cost prohibitive to make the expansion clamp 120 in a one-piece configuration, nor would it be as strong, because a lathe would be used. And then EDM (electrical discharge machine) it afterwards, versus this all being one solid chunk of stainless, becomes very heavy, very expensive. Thus, all in all, it is better to do the expansion clamp 120 in two pieces (tapered head screw 124 and expansion mandrel 128). After manufacturing and sale, later on a customer can permanently fasten these together, if they want.

Usage of Dedicated Fixtures During Manufacturing

Manufacturing the mount system 100 takes advantage of various dedicated fixturing mechanisms. The dedicated fixtures are not part of the final product, but instead act as a type of scaffolding to make the manufacturing process more efficient. With the dedicated fixtures described herein, it is possible to run numerous parts at a time, and increasing the amount of mount systems 100 produced in a single day.

These dedicated fixtures do not appear in the final product, but assist in manufacturing, and are part of the manufacturing processes disclosed and claimed within the embodiments herein. Switching to dedicated fixturing facilitates running multiple pieces at a time, without needing any type of vice to hold a particular piece in place.

Figure 4:
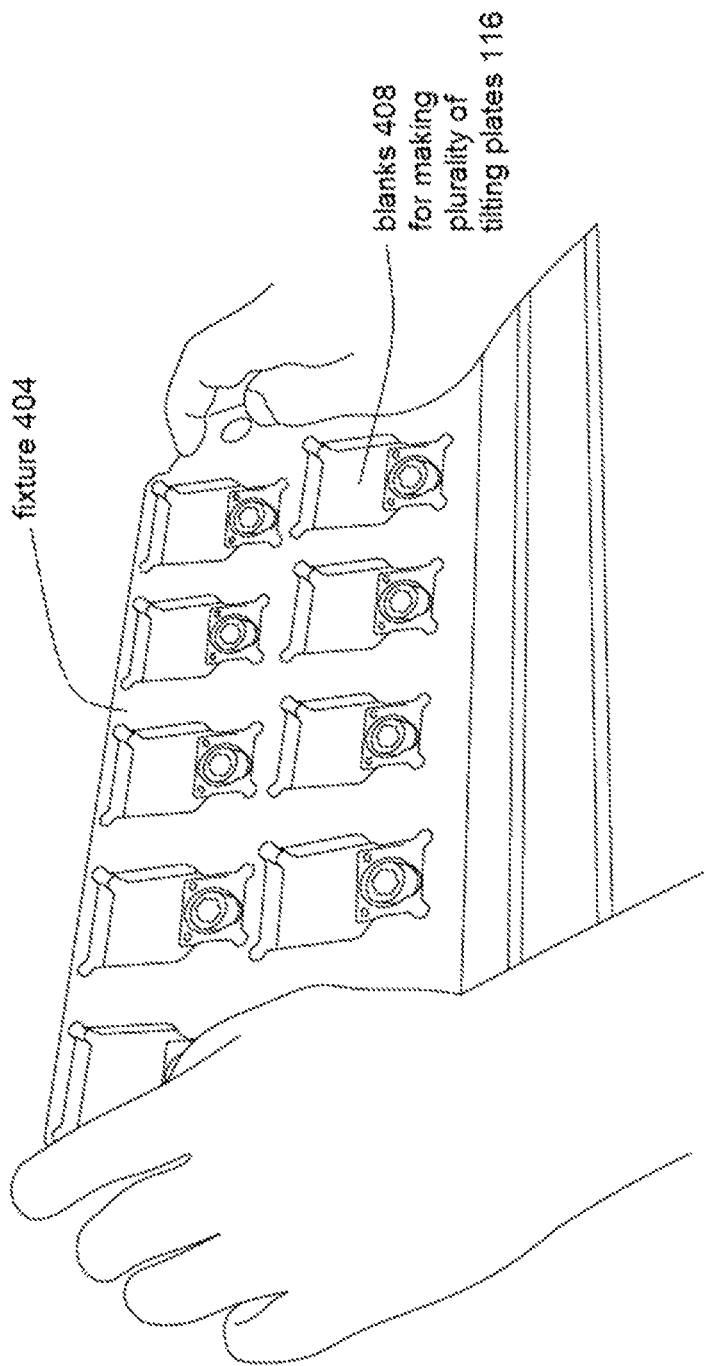
FIGS. 4 and 5 show examples of dedicated fixtures respectively.
Figure 5:
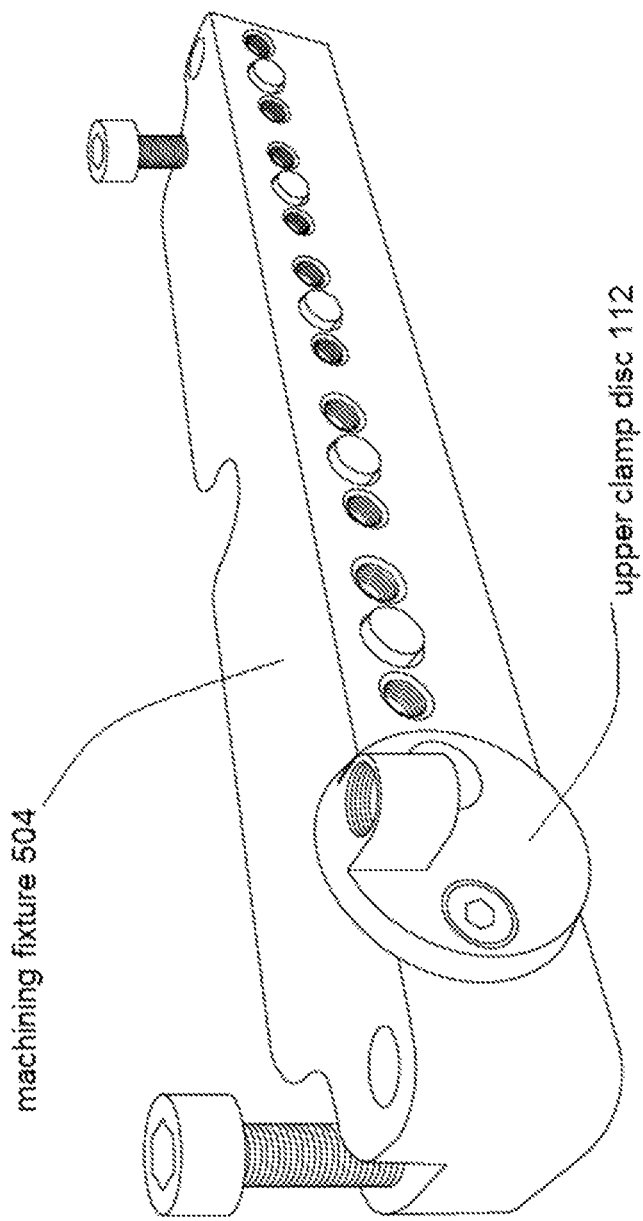

FIGS. 4-7 show examples of dedicating fixtures used in fabricating the mount system 100. FIGS. 4 and 5 show examples of dedicated fixtures 404, 504 respectively. FIG. 4 also shows some blanks 408 used roughed out for making tilting plates 116. That's for the tilting plate 116 for the first operation. Roughing out the blanks 408 facilitates making multiple pieces all at once, rather than putting them all into an individual.

The fixtures 1104, 1108 shown in FIG. 11 are suitable for holding blank stock for the rectangular base 104, again to run all these at once. Instead of having to run one at a time at each device and then the secondary operation finished, the blank stock gets flipped over, so as to face off the backside and then punching through any remaining holes. These holes are to help ensure the rectangular base 104 is conforming to plans and is not mis-tooled, mainly by ensuring it can only go in one way. Thus, the embodiments herein comprise both machining fixtures and also laser marking fixtures. The laser fixture 1104 doesn't have the offset posts 112 that are present in the machining fixture 1108.

The machining fixture 1108 shown in FIG. 11 ensures an operator couldn't put a part e.g. a "rough" on a fixture incorrectly. That is, the part can only go in one way. The machining fixture 1108 ensures a manufacturer can't put it in backwards. Can't put it in sideways.

FIG. 12 shows fixtures 1104 being used for laser-marking a rectangular base 104 that was recently cut (machined). The laser marking fixture 1104 ensures that a resource only be marked one way. That's why it has the opposite (offset) posts 112. So it can only fit in one way. In FIG. 12, the laser marking fixture 1104 is being used for marking the rectangular base 104.

Thus, in the end, post-manufacture, the rectangular base 104 has the big end holes, but also has those legacy offset holes which mate with the offset posts 1112 (FIG. 11), which are not something the customer cares about. These offset holes are just helpful to machine the part. Helpful for manufacturing, but they don't impede the customer's use of it in any way.

Gauging Steps

Figure 6:
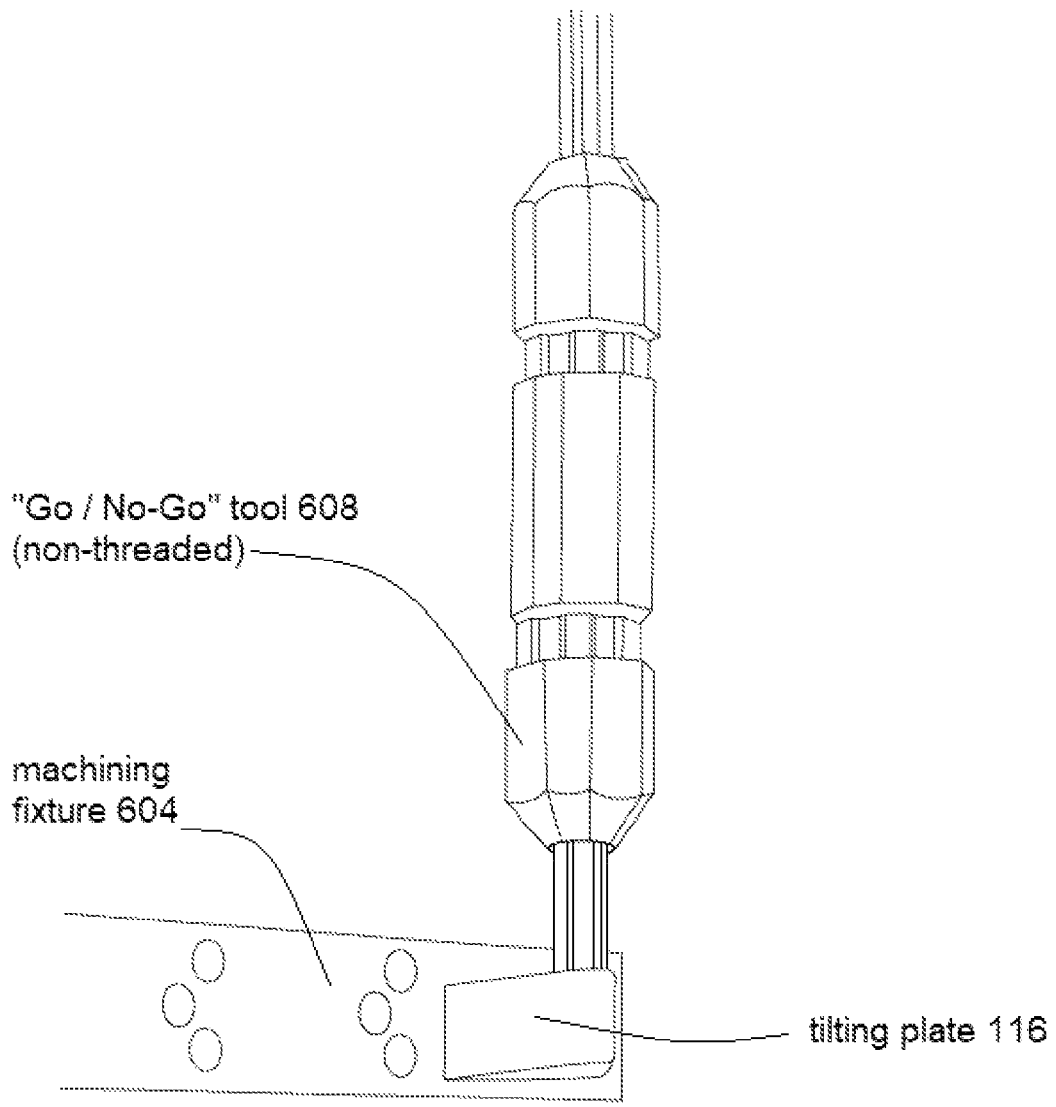
FIGS. 6 and 7 show example gauging steps.
Figure 7:
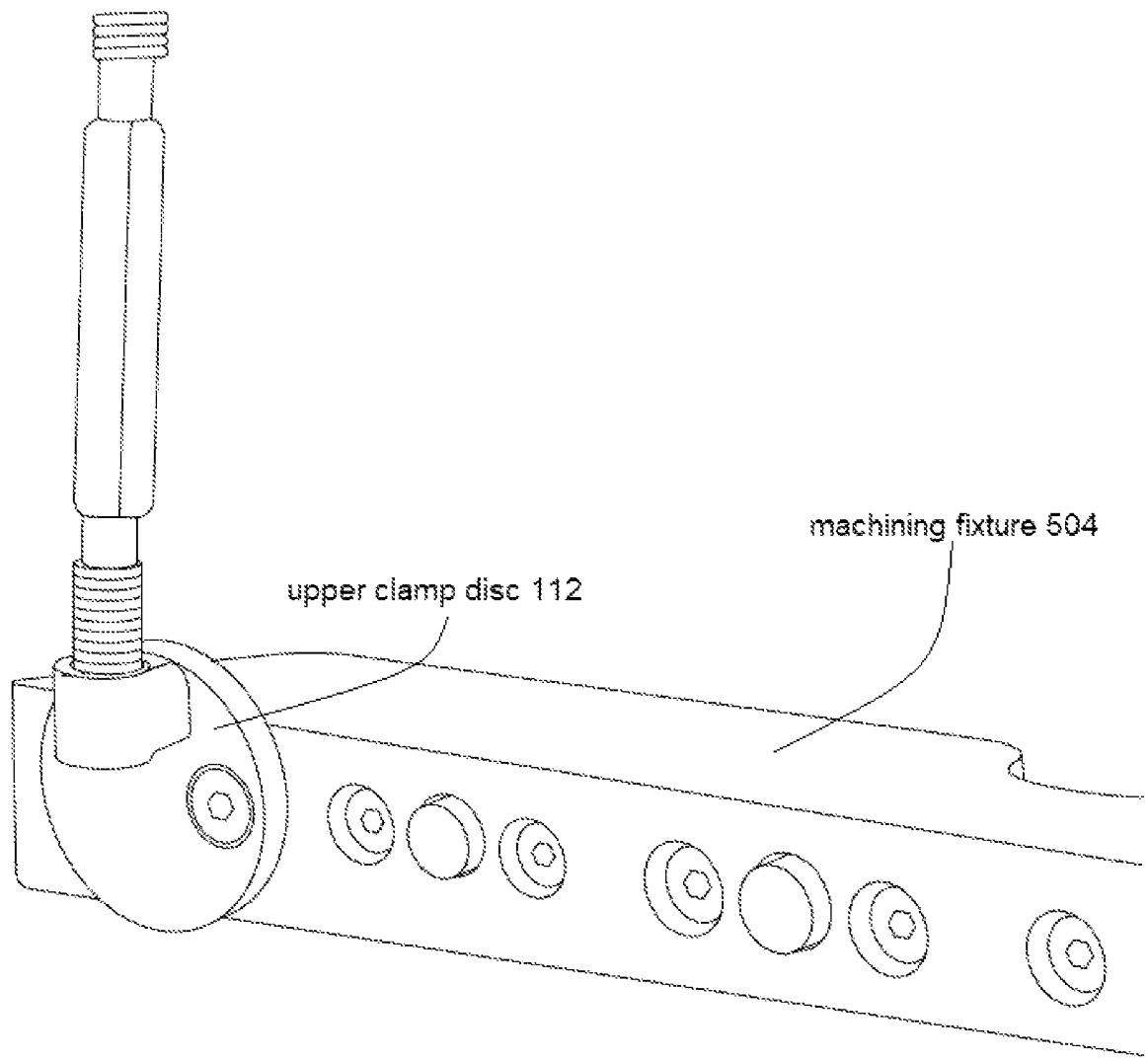

FIGS. 6 and 7 show example gauging steps, or "Go/No-Go" arrangements. If a part is machined improperly, the manufacturer can learn of this if the "Go/No-Go" pin cannot enter. That provides a very quick and easy check to do a pass/fail during the manufacturing process, which enables manufacturers quickly knowing whether the parts are properly made. If it is important that a specific part actually has to go in a specific location, this Go-pin can go in (enter), and (if machined improperly) the No-Go pin cannot enter.

FIG. 7 shows testing an upper clamp disc 112 testing for with the "Go/No-Go" tool. This provides assurance that our processes are properly producing the upper clamp disc 112 at the exact same size.

The manufacturing processes described herein thus use at least two "Go/No-Go" tools, one for checking threading e.g. the interior threading of the upper clamp disc 112, and another to check a non-threaded diameter within the tilting plate 116. Because these are both precision parts, it is important to flag any manufacturing error as early as possible in the manufacturing process, and prevent a mis-machined part from ever reaching any customer, or even coming close.

FIG. 5 shows a machining fixture 504 used for making a plurality of upper clamp discs 112, which have threaded surfaces. FIG. 7 shows use of a "Go/No-Go" tool for that threading.

If testing within a fixture, errors can be found right away. That's the whole point of continuous process control and error-checking on the fly. A manufacturer can use the Go/No-Go on the threading outside a fixture also. But if an item is mis-sized, mis-tooled, or improper, the manufacturer needs to know as early as possible in their processes. Call that in-process checking, or, process quality, using various process control devices\tools, of which "Go/No-Go" tools are merely one example.

Now moving to another "Go/No-Go" tool and a different fixture. FIG. 6 shows use of a Go/No-Go tool while it was still on the fixture 604 to convey "we can grab this early in the process and quickly detect errors very early". This specific "Go/No-Go" tool is non-threaded, merely checking spacing and circularity. Specifically, FIG. 6 shows checking the bore on a tilting plate 116. Just a round hole, only a bore, no threading.

Thus, the embodiments herein employ hand-tools, which perform both thread-checking and size-checking, and do so in-fixture.

Twin Spindle Lathe with Live Tooling

Figure 9:
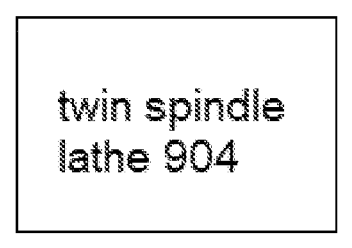

The manufacturing processes described herein take advantage of a twin spindle lathe 904 with live tooling, as shown in FIG. 9. The twin spindle lathe 904 can do machining (including milling) and turning in the same machine. The twin spindle lathe 904 does tasks "off the center" because this can do X-axis and Y-axis for the live tooling. Meanwhile, most live tooling lathes can only do X-axis. So the twin spindle lathe 904 is more of a "mill turn" than just a turning lathe. The live tooling capability of the twin spindle lathe 904 thus enables having tapped holes on round faces and round surfaces and other unusual features that normally require separate tooling.

Anodizing Steps

Anodizing makes the mount system 100 last longer in harsh industrial environments, and comes in multiple colors. Anodizing has several advantages, one of which is reduced rusting. Another feature is making a part easier to laser-mark and where the laser-marking lasts longer and has higher visibility.

Laser Marking Steps

FIGS. 11 and 12 show a test part. There exists a laser fixture 1104 to push a rectangular base 104 to be marked by laser marking mechanism 1204. The laser marking mechanism 1204 can do a directional pattern on any part. This adapter that goes onto that grid so that it was snap in. When we go to mark this part with the part number, we went to lock that up again.

The laser marking mechanism 1204 uses fiber and $CO_2$, resulting in laser ablation to the material rather than mere engraving. All of the markings arise from laser-ablating a particular surface. This includes charring the surface which achieves that bright white color. If doing engraving, can only get down to the intended aluminum color, which would just be that boring gray or silvery color. But laser ablating (charring) is better and stays visible longer.

FIG. 12 shows an example use of a laser marking fixture 1104 assisting in laser-marking a center line on a rectangular base 104.

Figure 8A:
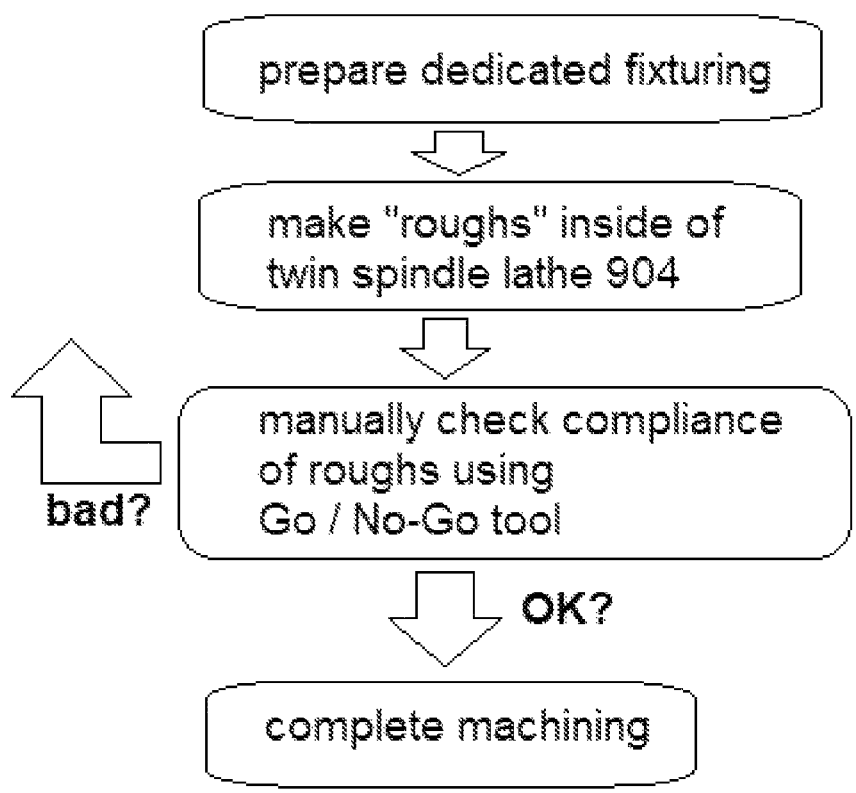
FIG. 8A shows a flowchart of a process of using dedicated fixtures to prepare roughs.
Figure 8B:
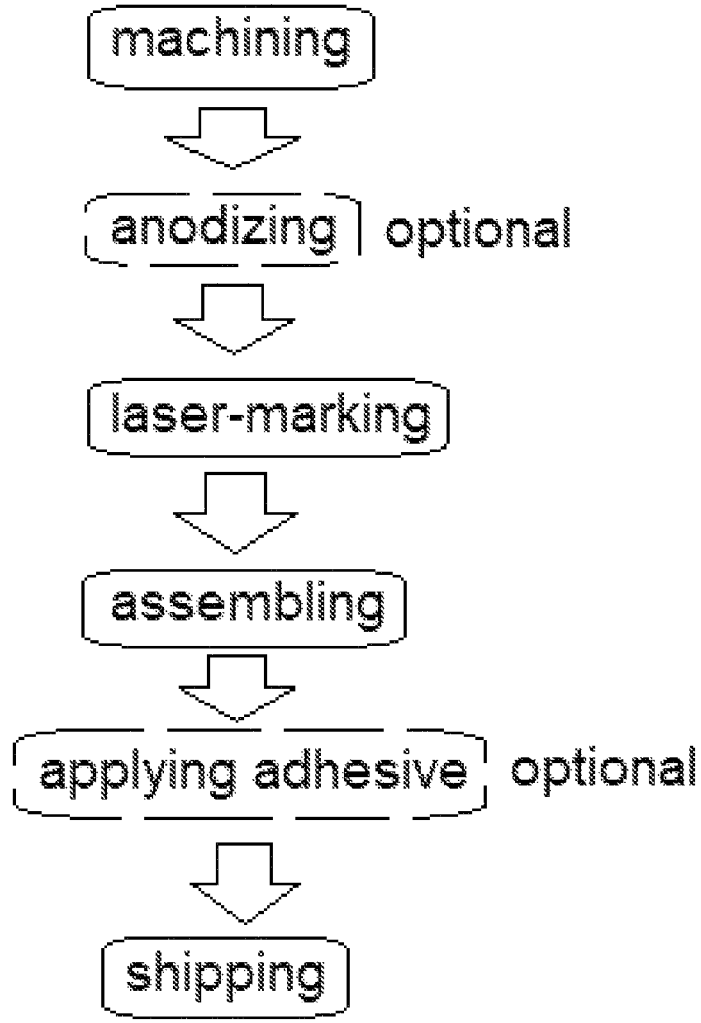
FIG. 8B shows an example process for manufacturing various of the components within the mount system.

When a rectangular base 104 is completed, or any other part within the mount system 100 is completed, it goes to the anodizer. After that, it is laser-marked. Flowcharts describing this are shown in FIGS. 8A and 8B. Specifically, FIG. 8A shows a flowchart of a process of using dedicated fixtures to prepare roughs, and then test certain parts of the intended part while still present in the dedicated fixture. FIG. 8B shows an example process for manufacturing various of the components within the mount system 100, comprising machining, anodizing, laser-marking, assembling, gluing, and shipping. As described herein, this six-step sequence applies to most of the parts within the mount system 100, but with various exceptions. For example, some of the parts of the mount system 100 are not anodized, and some of the parts do not have adhesive applied thereto.

Alternate Usages

Figure 10:
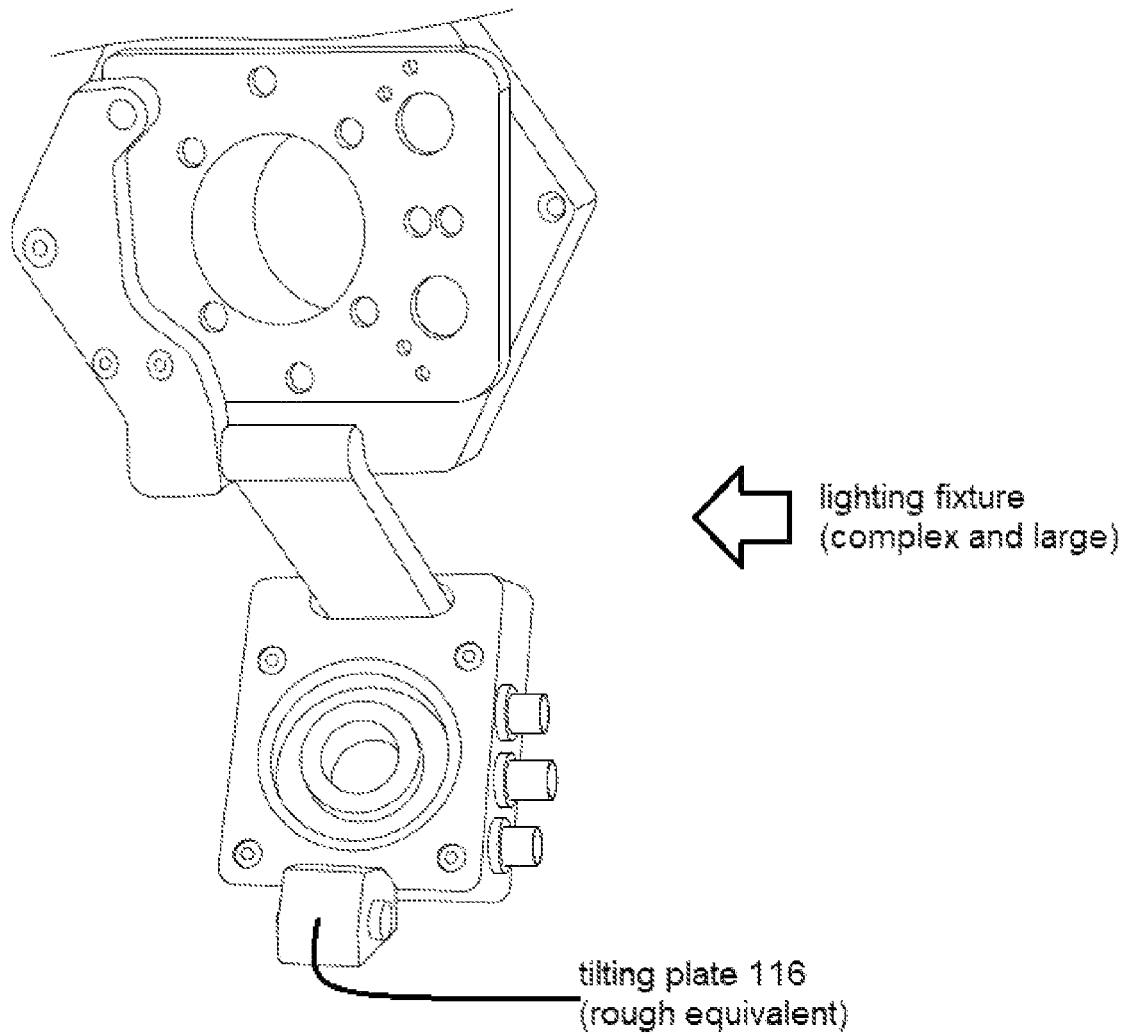
FIG. 10 shows an example embodiment of the mount system attached to a light fixture.

When the customer receives an un-assembled or partially-assembled mount system 100, normally it would just go together, and users put the two screws in and then install (fasten) the mount system 100 wherever is needed. But some mount systems 100 aren't used for attaching to cameras. Some mount systems 100 will mount other machine vision devices e.g. lighting (FIG. 10). Whatever the device being mounted, to attach the mount system 100, some type of tilting plate 116 must be used, either modified or as-is.

Further, the embodiments herein accommodate that some customers make their own adapter plates, and thus may not use the rectangular base 100 at all. As long as these customers accommodate the fact that lower clamp disc 108 and upper clamp disc 112 need to attach to something in order for the mount system 100 to work effectively, this customer-choice alteration can be effective.

Usage and Purpose of O-Ring 132

During assembly of the system 100, the O-ring 132 is located between the lower clamp disc 108 and the upper clamp disc 112. The O-ring 132 serves partly to ensure the upper clamp disc 112 doesn't turn freely so a user can position it more easily and their position is held. The presence of the O-ring 132 thus results in improved "stiction" or sticking power when setting up the mount system 100.

It is best to hold the upper clamp disc 112 in place just enough to where the upper clamp disc 112 is not sliding all over. Users may still want a little bit of tension, and that's what that rubber O-ring 132 provides. This involves a sufficient depth within the rectangular base 104. The rectangular base 104 has been manufactured out of 7075 aluminum because 6000 aluminum tends to overexpand and then the clamps become impaired. Conversely, 7075 aluminum degrades less.

A manufacturer may slide the O-ring 132 in, but it doesn't snap in place. The O-ring 132 is not used for a sealing purpose. Instead, the O-ring is used for the purpose of setting a position of the upper clamp disc 112, and then (once the user has decided), holding that position.

Once a user has an angle chosen for an upper clamp disc 112 and has locked it in, that user can go ahead and tighten the upper clamp disc 112 using e.g. a four-millimeter drive.

The more tension, the more crushing of the O-ring 132, so the more positive pressure that will occur. In turn, the more the upper clamp disc 112 will hold its position.

Additional Embodiments

There exists an alternate embodiment of the mount system 100 which will mechanically work differently the above. Specifically, in this alt-embodiment, a different expansion clamp is substituted for the expansion clamp 120. Regarding the existing expansion clamp 120, the indoor customers like the adjustability and the versatility of it.

However, outdoor applications or washdown applications or anything that's involving water, temperature change, these situations have different needs. Pin style expansion is not conducive to water-types of environments, due to temperature change and size changes that may occur. Thus, the embodiments herein further comprise a ruggedized mount system 100 which still has the same rotational ability, tilting ability, but with a proprietary type of piece of expansion hardware that actually swivels and changes its physical position, rather than the expansion clamp 120, which turns but does not otherwise move its position. This results in a type of customized swiveling hardware, with a taper fit. This embodiment works better in outdoor/washdown environments.

During assembly, the expansion clamp assembly 120, specifically the expansion mandrel 128, is screwed mechanically into the upper clamp disc 112 and then has glue applied on the threads of the expansion mandrel 128. Doing so assists in enhancing life of the threads before they finally degrade but only after long years of usage. The glue is a two-part compound that provides a chemical adhesion which yields a strong bond between the two dissimilar metals and the tolerances of the threads. This glue is needed because of the dissimilar materials, but also because there will be no reason that the upper clamp disc 112 would ever have any need to be separated from the expansion clamp 120.

Second Use of Adhesive\Glue

Another usage of adhesive (e.g. glue), is that a customer may wish to get entire expansion clamp 120 into position and permanently lock it in place with glue, and want to never move again. That shows what a customer might do, but is not what a manufacturer would do, as its better to leave this choice as a customer-option. Customer might do that gluing in the field. In other words, a customer may optionally glue the tapered head screw 124 into the expansion mandrel 128.

Semantics

Within this disclosure, the expressions machining and milling may be used. The embodiments herein use a variety of machining fixtures to achieve manufacturing efficiencies. Sometimes, this involves milling. However, milling is a very specific machining operation. All milling is machining, but not all machining is milling.

Next, there is a difference between a laser fixture and a milling\machining fixture. A laser fixture doesn't have any rigid clamping or anything like that, and is only for marking, a process in which no or minimal mechanical force is applied. Any laser marking process is not trying to move the part versus the milling machine. Meanwhile, a milling\machining machine is cutting not marking. If the mart being machined is not secured, it will just fly away, like using a saw and not holding onto the piece of wood.

Disclaimer

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A mount system for planar surfaces requiring a mountable device, comprising:
    a planar rectangular base configured to be attached to the planar surfaces;
    a lower clamp disc located within the rectangular base;
    an upper clamp disc seated on top of the lower clamp disc;
    the lower clamp disc having a circular bevel carved on its upper surface, thus forming a two-plane stepped bi-level upper surface;
    an upper beveled surface of the lower clamp disc having a smaller diameter than a diameter of a non-beveled lower surface of the lower clamp disc;
    an O-ring positioned between the upper clamp disc and the lower clamp disc;
    a tilting plate made from a first material and configured to accommodate the mountable device;
    an expansion clamp made from a second material; the expansion clamp comprising a tapered head screw and an expandable mandrel, both made from stainless steel; and the expansion clamp having the tapered head screw located inside the expandable mandrel;
    the tilting plate being connected to the upper clamp disc through the expansion clamp;
    the expandable mandrel further comprising threaded surfaces on its interior and on its exterior, thus having both male and female connectors;
    the male connector of the expandable mandrel being located within the upper clamp disc;
    a male portion of the tapered head screw being located within a female portion of the expandable mandrel;
    the expansion clamp being expandable by a user turning the tapered head screw to set the position of the expansion mandrel such that the expansion clamp clamps from within, internally;
    the male portion of the expandable mandrel being suitable for engagement with the upper clamp disc;
    the female portion of the expandable mandrel being suitable for engagement with a male portion of the tapered head screw;
    the expansion clamp being assembled using a two-phase glue that has separate activator and adhesive components; and
    the two-phase glue penetrating enough to where the upper disc clamp and expansion clamp lock together.

2. The mount system of claim 1, comprising:
    the first material being different from the second material.

3. The mount system of claim 1, comprising:
the tilting plate having a plate for holding the mountable device;
the tilting plate having a plate at its top and a cylinder underneath; and
the mountable device being attached to the tilting plate using two bolt-holes in the plate.

4. The mount system of claim 2, comprising:
the rectangular base and the upper clamp disc being made from aluminum.

5. The system of claim 1, further comprising:
the rectangular base having markings made by a laser mechanism using fiber and $CO_2$; and
the markings having components of laser ablation and charring.

6. The system of claim 1, further comprising:
the upper beveled surface of the lower clamp disc being concentric with the non-beveled lower surface of the lower clamp disc.

7. The system of claim 1, further comprising:
a first cylinder within the upper clamp disc being contiguous and non-sliced;
a second cylinder within the tilting plate being contiguous and non-sliced; and
the first and second cylinders configured to contact each other at exactly and only one contact point.

* * * * *